United States Patent [19]

McQuoid et al.

[11] Patent Number: 4,878,226
[45] Date of Patent: Oct. 31, 1989

[54] MULTIPLE POINT REMOTE TEMPERATURE SENSING

[75] Inventors: Bryan K. McQuoid, Simsbury, Conn.; Earl J. Charlson; Huber Graham, both of Columbia, Mo.

[73] Assignees: Combustion Engineering, Inc., Windsor, Conn.; Curators of the University of Missouri, Columbia, Mo.

[21] Appl. No.: 185,105

[22] Filed: Apr. 22, 1988

Related U.S. Application Data

[63] Continuation of Ser. No. 12,269, Feb. 9, 1987, abandoned.

[51] Int. Cl.⁴ .......................... G01K 7/16; G01K 13/00
[52] U.S. Cl. ...................................... 374/166; 338/26; 374/110; 374/124; 374/183
[58] Field of Search ............... 374/101, 111, 112, 114, 374/137, 166, 183; 324/158 P; 361/331; 338/26; 364/557

[56] References Cited

U.S. PATENT DOCUMENTS

| | | | |
|---|---|---|---|
| 3,163,703 | 12/1964 | McLoad | 338/26 X |
| 3,396,357 | 8/1968 | Borg et al. | 338/26 |
| 4,140,999 | 2/1979 | Conway | 374/111 X |
| 4,164,777 | 8/1979 | Knelp;, Jr. et al. | 361/331 |
| 4,372,693 | 2/1983 | Lutz | 374/111 |
| 4,440,509 | 4/1984 | Agarwal | 374/166 |
| 4,629,977 | 12/1986 | English | 324/57 Q |

Primary Examiner—Daniel M. Yasich
Attorney, Agent, or Firm—Chilton, Alix & Van Kirk

[57] ABSTRACT

A multiple point remote temperature sensing system includes a cable having temperature responsive segments as spaced along the length of the cable and being integral therewith. Each of the temperature responsive segments includes a temperature measuring device and a circuit which establishes a unique address for the segment whereby the local ambient temperature at each segment may be interrogated from a remote location.

29 Claims, 3 Drawing Sheets

MULTIPLE POINT REMOTE TEMPERATURE SENSING

This is a continuation of co-pending application Ser. No. 012,269 filed on Feb. 9, 1987, now abandoned.

BACKGROUND OF THE INVENTION

1. Field of the Invention

The present invention relates to the measurement of temperature and particularly to the sensing of the temperature at a plurality of points from a single location located remotely from such points. More specifically, this invention is directed to a system wherein multiple temperature responsive "probes" situated at different points of interest may be individually interrogated and especially to a system wherein the "probes" are passive and intregal with a cable. Accordingly, the general objects of the present invention are to provide novel and improved methods and apparatus of such character.

2. Description of the Prior Art

The sensing of temperature at multiple sites from a single location, a control room for example, is necessary or desirable in many fields of technology. Thus, in environments such as nuclear reactors, chemical processing facilities, computer installations, underground mines, storage facilities for various materials, etc. it is often necessary to monitor the temperature at a plurality of points in order to protect personnel and/or equipment from injury. The actual sensing of temperature at a site of interest can easily be accomplished using various commercially available sensor devices which provide an electrical signal commensurate with the local ambient temperature. However, in order to transmit the signals commensurate with the sensed temperature to a central monitoring location, it has been the customary practice to employ a hard wired system including a wire pair associated with each individual sensor device. At the monitoring location, i.e., at their receiving ends, these wire pairs are multiplexed to the measurement apparatus. This approach obviously requires a large number of wires. Further, since signal levels on the order of microvolts are generated by the sensor devices, very reliable contact to the sensor associated wires is required and sophisticated electronics must be employed to insure that the signals of interest will not be masked by noise. As a result of the above-discussed and other complexities of prior art hard wired systems, wherein a separate wire pair is associated with each temperature sensor, these systems have necessarily been lacking in the requisite reliability and have required constant maintenance.

It has also been proposed to transmit temperature related information from multiple remote measuring sites via optical fiber bundles. This, however, has proven to be prohibitively expensive for many applications due, in part, to the need to utilize active components at the measurement sites to transduce the measured temperature into an optical signal.

A thermocouple-type cable comprising a pair of dissimilar thermocouple wires separated by a ceramic such as magnesium dioxide has also been proposed. In such a cable a "hot spot" at any point along the cable will result in the generation of a temperature representative thermoelectric voltage. This voltage can be directly measured and translated into temperature. Impedance measurements can be made to determine the location of "hot spot" relative to a reference point. While such a thermocouple-type cable would eliminate the requirement for multiple wire pairs, tests have shown that reliable information cannot be obtained at temperatures below about 250° C. For most potential applications, the temperature induced injury which is to be avoided will occur below 250° C.

SUMMARY OF THE INVENTION

The present invention overcomes the above-briefly discussed and other deficiencies and disadvantages of the prior art by providing a novel and improved technique, and associated apparatus, for monitoring temperature at multiple remote sites. Apparatus in accordance with the invention comprises a plurality of "probes" which may be individually interrogated. These "probes" are arranged as thermally isolated discrete temperature sensing nodes along a cable. The cable is connected to a microprocessor via an appropriate interface module. The "probes", through the use of a temperature responsive component of a known type, will provide an electrical output signal commensurate with the temperature to which the "probe" is subjected. The microprocessor, in response to these output signals, is able to provide a temperature profile along the length of the cable for display purposes and/or for initiating alarms o other protective actions.

The "probes" will preferably be passive, i.e., will not include any active circuit components, and may include a programmable logic array. The probes may be connected in series or in parallel. The "probes" will preferably be incorporated within the cable itself and the cable positioned such that each of the temperature sensing nodes thereof will be in physical contact with structure at a site to be monitored.

A passive temperature responsive "probe" in accordance with one reduction to practice of the invention comprised a tuned circuit. These tuned circuits may be resonant "tank" circuits, i.e., parallel LC circuits. A component having a resistance which varies with temperature, a thermistor for example, is connected in parallel with each tuned circuit. Accordingly, the impedance of each "probe" or segment varies inversely with temperature. A plurality of such segments, each having a different resonant frequency "address", are connected in series to define a continuous cable system having "probes" distributed along its length. This cable system may be interrogated by excitation with the frequencies of the tuned segments and an impedance measurement taken at each interrogation frequency.

In a alternative embodiment, each probe includes a microchip encapsulated in an electrically non-conductive medium having high thermal conductivity. The microchips consist of programmable logic and a temperature responsive device is connected to each microchip. The microchips are connected in parallel between the cable conductors. The microchips and their associated temperature sensors, i.e., the sensing nodes of the cable, are separated by cable segments comprised of electrically non-conductive material having low thermal conductivity. Each microchip has a unique address whereby it may be interrogated to read a temperature related signal, generated by the microchip logic, commensurate with the condition of the associated temperature responsive device.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which.

DESCRIPTION OF THE DISCLOSED EMBODIMENT

Figure 1:
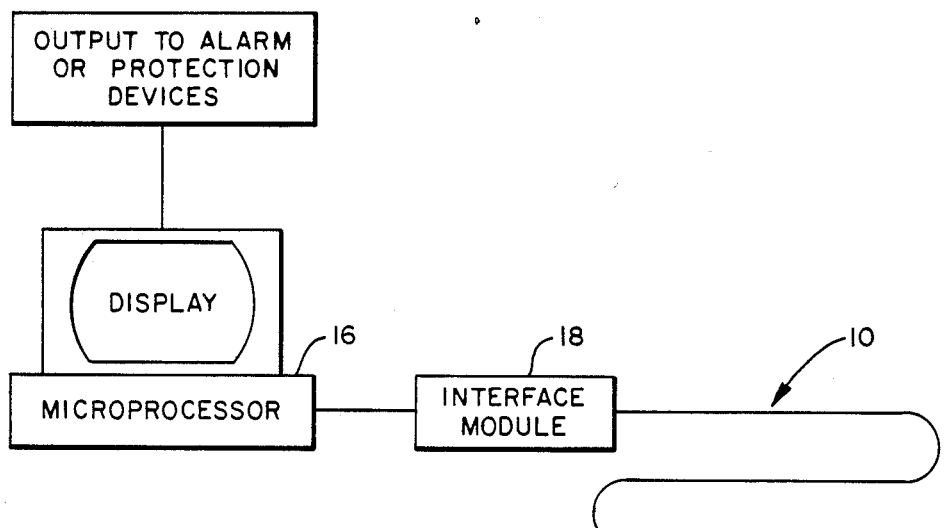
FIG. 1 is a system block diagram of the present invention.
Figure 2:
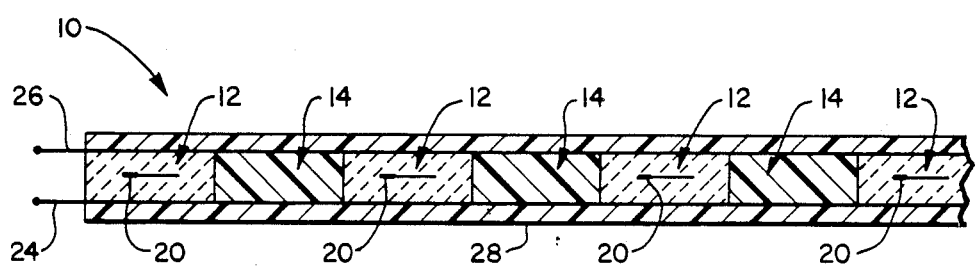
FIG. 2 is a cross-section schematic representation of the cable of the system of FIG. 1.

With reference now to the drawing, a temperature measuring system in accordance with the present invention is generally shown in FIG. 1. This system comprises a temperature sensitive "cable" which has been indicated generally at 10. As may be seen from FIG. 2, cable 10 has a plurality of discrete temperature sensing nodes 12, i.e., temperature sensing stages or probes, distributed at desired points along the length of the cable. The temperature sensing nodes are separated and thermally isolated from one another by inactive cable segments 14. Cable 10 may, for example, have a sensitivity in the 30°-150° C. temperature range and, again by way of example, could be employed to monitor grain elevator temperature to prevent spontaneous combustion. Cable 10 will be connected to a microprocessor 16 via an appropriate interface module 18. The nature of the interface module 18 will, of course, be dependent upon the cable construction. The interface module 18 thus may include any or all of an analog-to-digital converter, frequency meter, voltage meter, etc.. The system is characterized by the ability to individually interrogate each temperature sensing node 12 of cable 10 to "read" a signal commensurate with the node local ambient temperature. Microprocessor 16 thus generates the unique address of each node and computes, from the signals received from cable 10 when the nodes are interrogated, the temperature at each node and displays this information. The microprocessor may also, pursuant to a program, produce output signals to activate alarms and/or to cause some protective action, such as energizing a sprinkler system, to be initiated.

Figure 3:
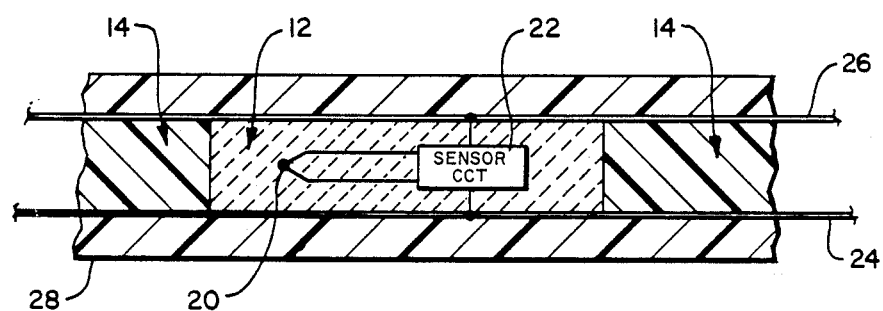
FIG. 3 is an enlarged block diagram representing a first embodiment of a temperature sensing segment of the cable of FIG. 2.

Referring now to FIG. 3, one of the active temperature sensing stages 12 of cable 10 is shown in block diagram form. The temperature sensing stage will include a temperature responsive element 20 which, for example, may comprise a passive circuit component such as a thermocouple or thermistor. Each temperature responsive element 20 will be connected to an addressable sensor circuit 22, i.e., a circuit which defines the unique name or address of the stage 12 thus enabling it to be individually interrogated. The circuits 22 will be connected to one or both of the cable conductors 24, 26. In a preferred embodiment the temperature responsive element and its associated addressable circuit will be embedded within the cable 10 and thus be protected by the cable sheath 28. In order to conduct heat from the structure or area being monitored to the temperature responsive elements 20, each element and its associated circuit 22 are preferably encapsulated in a material, typically a ceramic, which has a high thermal conductivity while being electrically non-conductive Examples of encapsulating materials which may be used are magnesium silicide, boron carbide and boron nitride. The encapsulated circuit-sensor element components are placed within the sheath 28 which may be partly removed in the vicinity of the nodes or stages 12 if necessary The active temperature sensing stages 12 of cable 10 will, as noted above, be separated by inactive segments 14 comprised of a suitable insulator medium along or through which the cable conductors pass. This insulator medium will typically have some degree of flexibility and will be characterized by low thermal conductivity and electrical non-conductance. Suitable organic insulator materials comprise polytetrafluoroethylene, polyvinyl chloride, cross-linked polyethylene, ethylenepropylenediene monomers (EPDM), ethylenepropylene monomers (EPM), and polychloroprene.

In accordance with a first embodiment of the invention, the circuits 22 may each comprise a programmable logic array in microchip form. The logic circuits will have unique addresses and may have the capability to convert the signal provided by a thermocouple or other temperature responsive device to a signal commensurate with temperature. The microchips will preferably be temperature and radiation hardened military standard components. The logic circuits 22 will be multiplexed along the shared dual lead transmission line, i.e., cable conductors 24 and 26. The address of each logic circuit will identify its position along the cable and thus the microprocessor 16 will be able to calculate the distance down the cable to a temperature which has been read.

Figure 4:
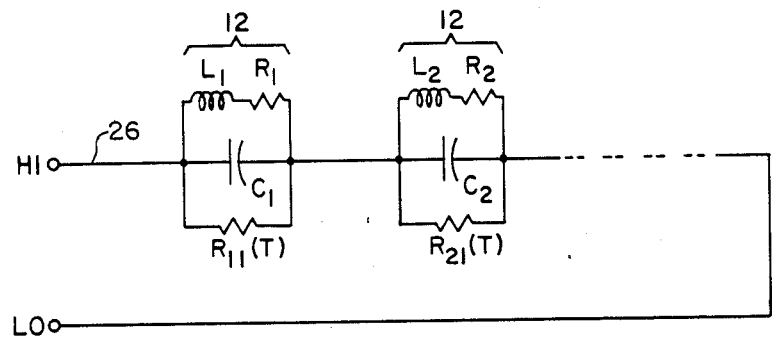
FIG. 4 is partial electrical circuit schematic diagram of a second embodiment of the cable of FIGS. 2, FIG. 4 showing two temperature sensing segments.

Referring now to FIG. 4, a cable 10 in accordance with a second embodiment of the present invention is shown partly and schematically. In the cable of FIG. 4, each of the temperature sensing nodes of the cable comprises a parallel resonant, i.e., tank, sensor circuit. Each of these circuits, as may be seen by reference to FIG. 5, includes an inductance which, in one reduction to practice of the invention, comprised an iron powder core coil 30. The inductances of the coils 30 is indicated on FIG. 4 as L1, L2 and the coil series resistances as R1 and R2. The tuned circuits also each include a capacitor 32, the capacitors being represented in FIG. 4 as C1 and C2. The resonant circuits comprising each sensing node are connected in series with one another and with one of the conductors 24 of the cable 10 as shown. Each sensing node also includes a thermistor 34, i.e., a resistance element having a resistance which varies inversely with temperature. The tuned circuits are "loaded" with the thermistors which are indicated in FIG. 4 as $R_{11}(T)$ and $R_{12}(T)$. Each of the resonant sensor circuits will be tuned to a different frequency which comprises the unique address of the circuit In one reduction to practice each tuned circuit comprising the cable was separated in resonant frequency from any other tuned circuit by at least 30 kHz.

Figure 6:
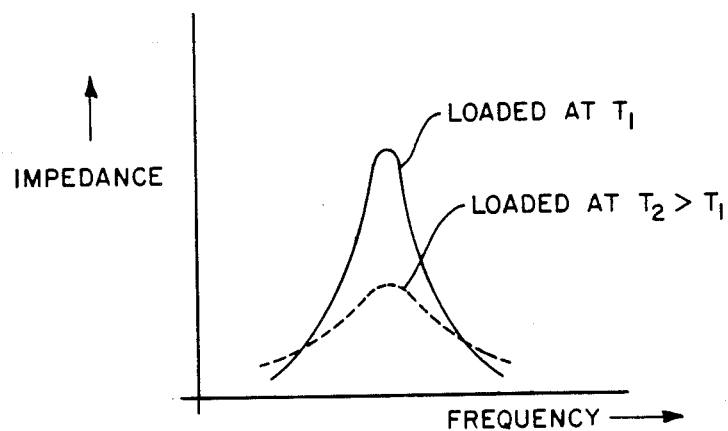
FIG. 6 is a graphical showing of the impedance vs frequency characteristics of the temperature sensing segment of FIGS. 4 and 5.

FIG. 6 shows that, as the temperature at the sensing node or segment increases, the resistance of its thermistor will decrease and thus the impedance vs frequency curve of the sensing node will change. Restated, as clearly shown in FIG. 6, the impedance of a temperature sensing node 12 of cable 10 at or near resonance varies with the temperature to which the thermistor at the node is subjected. Thus, the temperature at the node may be calculated from the measured impedance.

Figure 5:
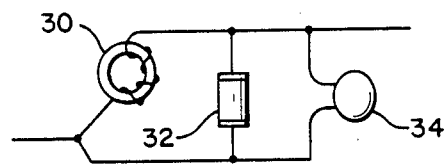
FIG. 5 is a sketch depicting the actual construction of a temperature sensing segment of the embodiment of FIG. 4.
Figure 7:
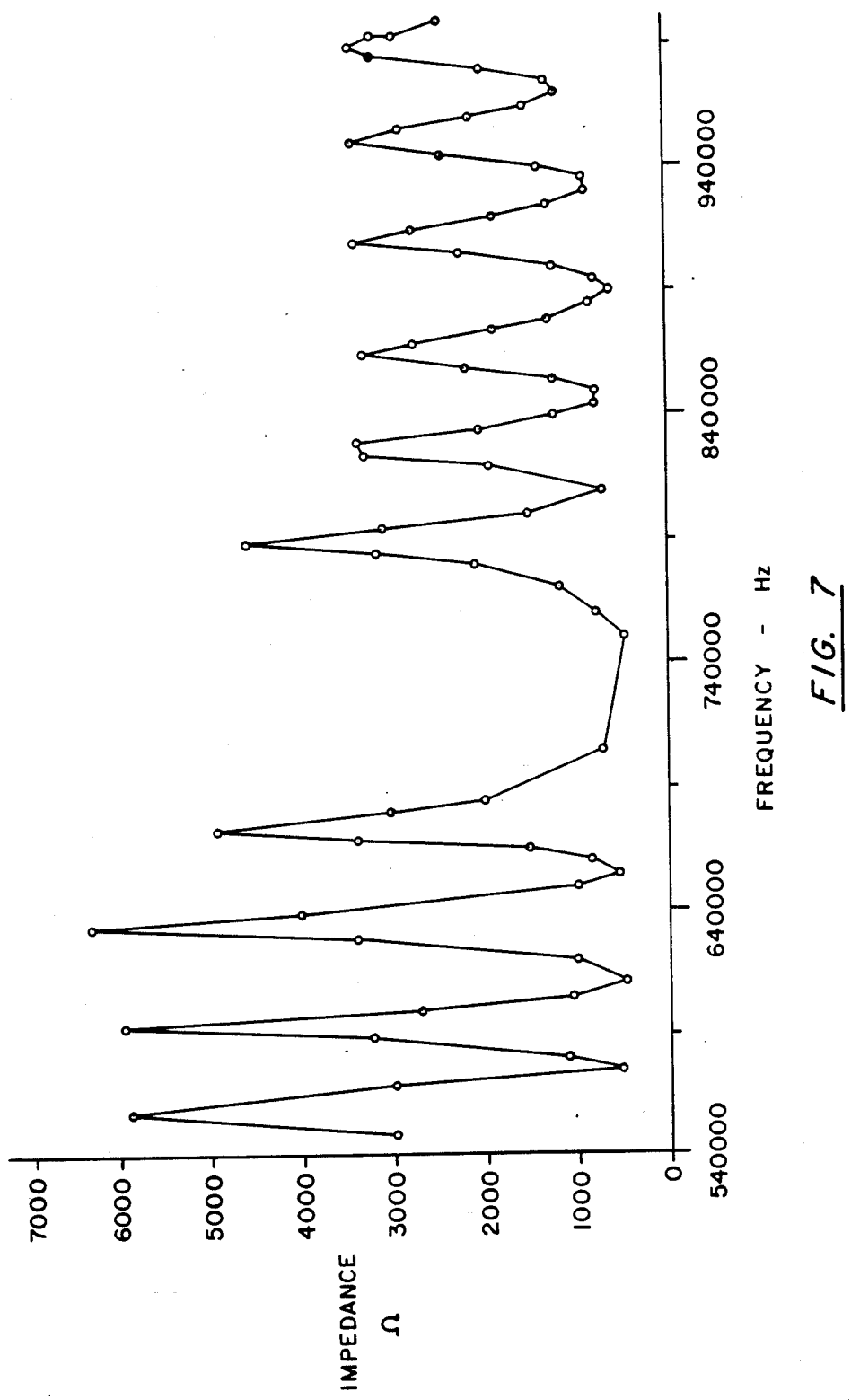
FIG. 7 is a graphical showing of the impedance vs frequency characteristic of a ten segment cable of the type depicted in FIG. 4.

FIG. 7 is a plot of impedance vs frequency for an actual ten segment cable, i.e., a cable having ten of the separately tuned temperature sensing nodes depicted in FIGS. 4 and 5. As should now be obvious, as a result of by scanning the impedance of the cable by excitation thereof with the known resonant or near resonant frequencies of each segment, individual single segment impedances can be measured and, from these measured impedances, single segment ambient temperatures can be calculated. Accordingly, employing the system of FIG. 1 with the cable of FIGS. 4 and 5, multiple site temperature measurements can be accomplished using a single pair of conductors by means of scanning impedance as a function of frequency. The microprocessor 16 will generate "address" signals to control a scanning frequency generator in the interface module 18. Thus, the embodiment of the invention depicted in FIGS. 4 and 5 provides the ability to geometrically scan a cable, i.e., address spatially separated temperature responsive components carried by a cable, by changing excitation signal frequency.

While preferred embodiments of the foregoing multiple point remote temperature sensing device have been described for purposes of illustration, the foregoing description should not be deemed a limitation of the invention disclosed herein. Accordingly various modifications, adaptations, and alternatives may occur to one skilled in the art without departing from the spirit and scope of the present invention.

What is claimed is:

1. Apparatus for sensing the temperature at a plurality of remotely located points in a predetermined sequence comprising:

elongated cable means, said cable means having a pair of opposite ends and at least a pair of access terminals at a first of the said ends thereof, said cable means including a conductor extending from each of said access terminals to the second end thereof, said cable means further including plural spatially separated inactive segments positioned along the length thereof, said inactive segments being comprised of material which is an electrical and thermal insulator;

a plurality of spatially separated temperature responsive electrical circuit components carried by said cable means, said components being located along said cable means in regions between said inactive segments thereof, each of said components providing a signal which varies as a function of local ambient temperature;

a plurality of sensor circuits, each of said sensor circuits being juxtapositioned to and electrically connected to an associated one of said temperature responsive components, said sensor circuits each having a unique address and being responsive to an interrogating signal which includes the unique address;

means connecting each of said sensor circuits to at least a first of said cable means conductors whereby information commensurate with the signal provided by said temperature responsive components may be sampled via the sensor circuit associated therewith in response to an interrogating signal which includes the sensor circuit address; and address signal generator means connected to said first cable means conductor via a cable means access terminal for generating interrogating signals for said sensor circuits in a predetermined sequence, each of said interrogating signals including the address of a sensor circuit whereby the information commensurate with the signals provided by said temperature responsive components will be individually available on said first cable means conductor.

2. The apparatus of claim 1 wherein each of said temperature responsive components and its associated sensor circuits are encapsulated in an electrical insulating material having a high thermal conductivity.

3. The apparatus of claim 2 wherein each of said encapsulated temperature responsive components and associated sensor circuit are integral with said cable means and abuts a pair of adjacent non-active segments thereof to define a flexible continuous cable having a substantially constant outer diameter.

4. The apparatus of claim 3 wherein said non-active cable means segments are comprised of an organic electrical insulating material which has low thermal conductivity.

5. The apparatus of claim 2 wherein said temperature responsive components and associated circuits are encapsulated in a ceramic material.

6. The apparatus of claim 5 wherein each of said encapsulated temperature responsive components and its associated sensor circuit is integral with said cable means and abuts a pair of adjacent non-active segments thereof to define a continuous cable having a substantially constant outer diameter.

7. The apparatus of claim 1 wherein said non-active cable means segments are comprised of an organic electrical insulating material which has low thermal conductivity.

8. The apparatus of claim 1 wherein said non-active cable means segments are comprised of a flexible organic electrical insulating material which has a low thermal conductivity.

9. The apparatus of claim 1 wherein each of said temperature responsive components and its associated sensor circuit are integral with said cable means and wherein said cable means has a substantially constant outer diameter.

10. The apparatus of claim 9 wherein said sensor circuits are connected in parallel between said cable conductors.

11. The apparatus of claim 9 wherein said non-active cable means segments are comprised of a flexible organic electrical insulating material which has a low thermal conductivity.

12. The apparatus of claim 11 wherein each of said temperature responsive components and its associated sensor circuits is encapsulated in an electrical insulating material having a relatively high thermal conductivity, said encapsulated components and circuits being integral with said cable means and abutting non-active segments thereof.

13. The apparatus of claim 12 wherein said the insulating material is a ceramic.

14. The apparatus of claim 13 wherein said ceramic material is selected from the group consisting of magnesium silicide, boron carbide, and boron nitride.

15. The apparatus of claim 14 said flexible organic material is selected from the group consisting of polytetrafluoroethylene, polyvinyl chloride, cross-linked polyethylene, ethylenepropylenediene monomers (EPDM), ethylenepropylene monomers (EPM), and polychloroprene.

16. The apparatus of claim 1 wherein said sensor circuits are connected in parallel between said cable conductors.

17. The apparatus of claim 1 wherein said sensor circuits are connected in series.

18. The apparatus of claim 1, wherein at least some of said sensor circuits are resonant circuits and wherein each of said resonant circuits has a different resonant frequency.

19. The apparatus of claim 18, wherein said sensor circuits are parallel resonant circuits defined by passive circuit components and wherein the temperature responsive component connected to each of said parallel resonant circuits is characterized by a resistance which varies with temperature.

20. The apparatus of claim 19 wherein said temperature responsive components are connected in parallel with said parallel resonant circuits.

21. The apparatus of claim 19 wherein said temperature responsive components are thermistors.

22. The apparatus of claim 18 wherein said sensor circuit unique addresses comprise the resonant frequency thereof and wherein said address signal generator means includes a scanning frequency generator.

23. The apparatus of claim 22 wherein said temperature responsive components are characterized by an impedance which varies with temperature and are connected in parallel with said sensor circuits whereby the impedance of each parallel connection of a sensor circuit and temperature responsive component will vary with temperature and the information commensurate with the signals provided by said temperature responsive components will be the impedance of each parallel sensor circuit/temperature responsive component combination at its unique resonant frequency.

24. The apparatus of claim 23 wherein said sensor circuits are parallel resonant circuits and the said variable impedance of said temperature responsive components comprises the resistance thereof.

25. The apparatus of claim 24 wherein each of said temperature responsive components and its associated resonant circuit is encapsulated in electrical insulating material.

26. The apparatus of claim 25 wherein said non-active cable means segments are comprised of a flexible electrical insulating material.

27. The apparatus of claim 26 wherein said flexible electrical insulating material has a low thermal conductivity.

28. The apparatus of claim 27 wherein each of said encapsulated temperature responsive components and associated sensor circuit is integral with said cable means and abuts a pair of adjacent non-active segments thereof to define a flexible continuous cable having a substantially constant outer diameter.

29. The apparatus of claim 28 wherein said parallel resonant sensor circuits are connected in series along said first cable means conductor.

* * * * *